United States Patent
Sosnowski et al.

(10) Patent No.: US 12,498,008 B2
(45) Date of Patent: Dec. 16, 2025

(54) ROTOR CLIP FOR BRAKE ASSEMBLY

(71) Applicant: GOODRICH CORPORATION, Charlotte, NC (US)

(72) Inventors: Mirosław Stanisław Sosnowski, Mirków (PL); Aleksander Andrzej Błachut, Ozimek (PL)

(73) Assignee: GOODRICH CORPORATION, Charlotte, NC (US)

( * ) Notice: Subject to any disclaimer, the term of this patent is extended or adjusted under 35 U.S.C. 154(b) by 390 days.

(21) Appl. No.: 18/323,610

(22) Filed: May 25, 2023

(65) Prior Publication Data

US 2023/0400075 A1 Dec. 14, 2023

(30) Foreign Application Priority Data

Jun. 8, 2022 (EP) .................................... 22461566

(51) Int. Cl.
*F16D 65/12* (2006.01)
*F16D 65/02* (2006.01)

(52) U.S. Cl.
CPC ......... *F16D 65/123* (2013.01); *F16D 65/126* (2013.01); *F16D 2065/1348* (2013.01); *F16D 2065/1372* (2013.01); *F16D 2065/1392* (2013.01)

(58) Field of Classification Search
CPC ... F16D 65/123–128; F16D 2065/1348; F16D 2065/1372
USPC ................................. 188/18 A, 71.5, 218 XL
See application file for complete search history.

(56) References Cited

U.S. PATENT DOCUMENTS

| | | | | |
|---|---|---|---|---|
| 3,927,740 | A * | 12/1975 | Zarembka | F16D 65/126 188/218 XL |
| 4,465,165 | A | 8/1984 | Bok | |
| 4,863,001 | A | 9/1989 | Edmisten | |
| 7,303,055 | B2 * | 12/2007 | Eckert | F16D 55/36 188/218 XL |
| 7,766,133 | B2 * | 8/2010 | Cress | F16D 65/126 188/218 XL |

(Continued)

FOREIGN PATENT DOCUMENTS

| | | |
|---|---|---|
| DE | 2615651 | 10/1976 |
| GB | 2066911 | 7/1981 |

(Continued)

OTHER PUBLICATIONS

European Patent Office, European Search Report dated Oct. 28, 2022 in Application No. 22461566.6.

*Primary Examiner* — Christopher P Schwartz
(74) *Attorney, Agent, or Firm* — SNELL & WILMER L.L.P.

(57) ABSTRACT

A clip assembly for a rotor disk of a brake assembly, the clip assembly comprising: a clip formed of sheet metal to fit over an end of a lug of the rotor disk, the clip shaped to have a top surface that extends in a first plane from a first side and then transitions, at an opposite, second side, by a first bend into a front surface that extends in a second plane from a third side at the first bend to a fourth side and transitions by a second bend to an under-surface extending in a third plane to a fifth end, the top surface, the first bend, the front surface, the second bend and the under surface together defining a hook configuration such that, in use, the top surface fits over a top surface of the lug onto which it is mounted.

14 Claims, 3 Drawing Sheets

(56) References Cited

U.S. PATENT DOCUMENTS

| | | | |
|---|---|---|---|
| 7,802,758 B2 * | 9/2010 | Cress | F16D 65/126 188/73.2 |
| 11,346,416 B2 * | 5/2022 | Lindner | F16D 65/123 |
| 2021/0332865 A1 | 10/2021 | Linder et al. | |

FOREIGN PATENT DOCUMENTS

| | | |
|---|---|---|
| GB | 2201475 | 9/1988 |
| WO | 2005106279 | 11/2005 |

* cited by examiner

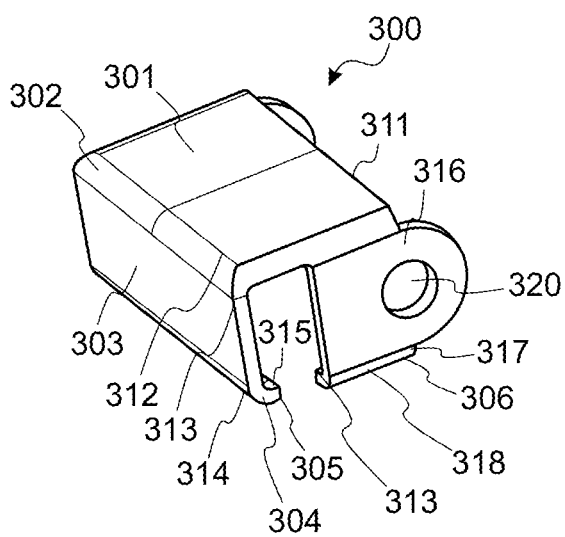
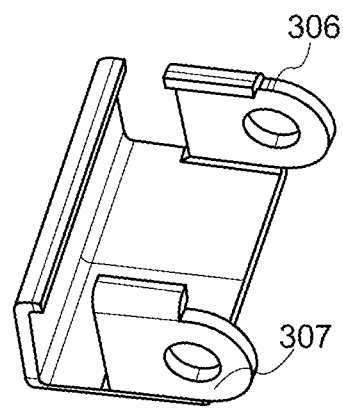
FIG. 4
FIG. 5
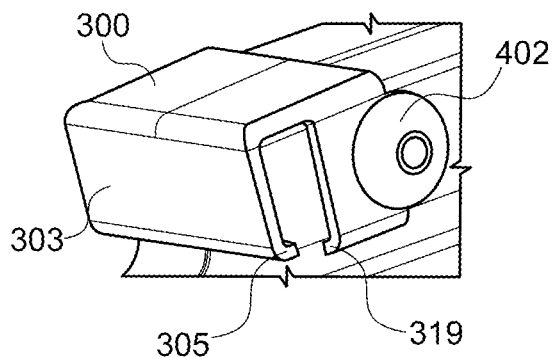
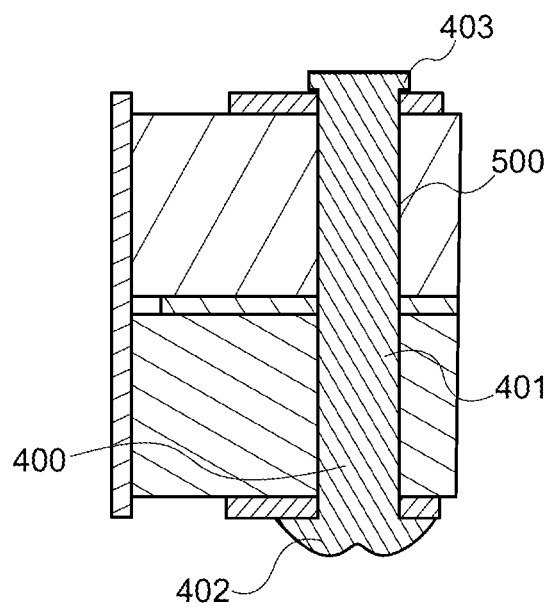
FIG. 6
FIG. 7
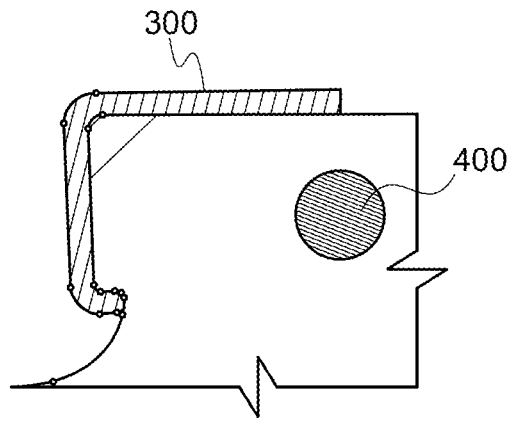
FIG. 8

ROTOR CLIP FOR BRAKE ASSEMBLY

CROSS-REFERENCE TO RELATED APPLICATIONS

This application claims priority to, and the benefit of, EP Patent Application No. 22461566.6, filed Jun. 8, 2022 and titled "ROTOR CLIP FOR BRAKE ASSEMBLY," which is incorporated by reference herein in its entirety for all purposes.

FIELD

The present disclosure relates to a clip for the rotor of a brake assembly.

BACKGROUND

Braking assemblies for applying a braking force to a rotating body e.g. a wheel, are well known and typically comprise a brake stack of alternating rotor and stator disks. The braking assembly is actuated by applying a force to an actuator e.g. a piston which applies force to a pressure plate which compresses the rotor and stator disks of the brake stack together to cause deceleration and braking by friction. Typically, the rotor disks are provided with circumferential drive lugs via which the compressive force is applied to the rotor disks. Such braking mechanisms are well known and will not be described further in any detail. Brake assemblies operating in this way are common in aircraft and other vehicles. Where a high braking force is required, such as in aircraft, the rotor disks have to be made of a strong, heavy duty material such as a strong steel material or, more recently, carbon material. Carbon is preferred in many applications e.g. in aircraft, because it is more lightweight than steel for the same strength. Reduced weight of parts in or on aircraft allow for a reduction in fuel consumption and, in turn, reduced $CO_2$ emissions. Because of the material used, the rotor disks are expensive parts. In order to prolong the life of these disks, rotor clips are typically provided on the outer circumference of the disk e.g. on the drive lugs to provide some protection against wear of the rotor disk material. The clips transfer the drive force to the rotor drive lug. These clips, when they become worn, can be easily and relatively inexpensively replaced, allowing the more expensive rotor disks to be reused and extending their life.

Various designs for rotor clips are known, these include a spring clip secured over the rotor drive lug by means of a rivet or similar fastener. Half cap clips are also known, which fit over just the end part of the drive lug. Floating clips are also known, which are positioned between drive lugs and allow for some movement of the clip during braking. Again, these clips are secured in position by means of rivets or pins or similar fasteners. Usually, two rivets are passed through aligned holes in the clip and the lug and are secured by rivet heads.

As high torques are transferred by the clip, the fasteners securing the clips in place are also subject to high forces acting perpendicular to the force to be transmitted to the clip and these rivets/pins are subject to bending or breakage due to these forces. Furthermore, such fasteners will have a head that protrudes beyond the surface of the clip which can also be damaged or can cause damage to other parts. The force on the fasteners and the forces exerted by the fasteners in known designs might not be equally distributed and hot spots can be created where the fasteners exert forces on the clip or the rotor, e.g. at the back of the rivet heads, thus causing damage to the clip and/or rotor disk. Rivets that can provide the required strength and security are expensive and difficult to manufacture and use. The use of these rivets also introduces the risk of damage to the rotor disk material when the clips are being replaced. To assemble the clip, several steps are required—the clip has to be placed over the rotor lug and the holes in the clip aligned with the holes through the lug, then two separate pins or rivets need to be passed through the holes and secured with a further head or nut.

There is a need for an improved clip that avoids or mitigates these problems

SUMMARY

According to the disclosure, there is provided a clip assembly for a rotor disk of a brake assembly, the clip assembly comprising: a clip formed of sheet metal to fit over an end of a lug of the rotor disk, the clip shaped to have a top surface that extends in a first plane from a first side and then transitions, at an opposite, second side, by a first bend into a front surface that extends in a second plane from a third side at the first bend to a fourth side and transitions by a second bend to an under-surface (305) extending in a third plane to a fifth end, the top surface, the first bend, the front surface, the second bend and the under surface together defining a hook configuration such that, in use, the top surface fits over a top surface of the lug onto which it is mounted, the front surface fits against a front end of the lug and the under surface hooks underneath the front end of the lug.

Also provided is a method for assembling such a clip, as well as a rotor disk, a brake assembly and a wheel assembly having such a clip design.

BRIEF DESCRIPTION OF THE DRAWINGS

Examples of the clip according to the disclosure will now be described with reference to the drawings. It should be noted that other examples are possible within the scope of the claims.

FIG. 4 shows a clip according to the disclosure;

FIG. 5 shows the clip of FIG. 4 from below;

FIG. 6 shows a clip such as shown in FIG. 4 attached to a rotor lug;

FIG. 7 shows a section through a clip attached to a lug;

FIG. 8 is a cross-section through the lug.

DETAILED DESCRIPTION

Figure 1:
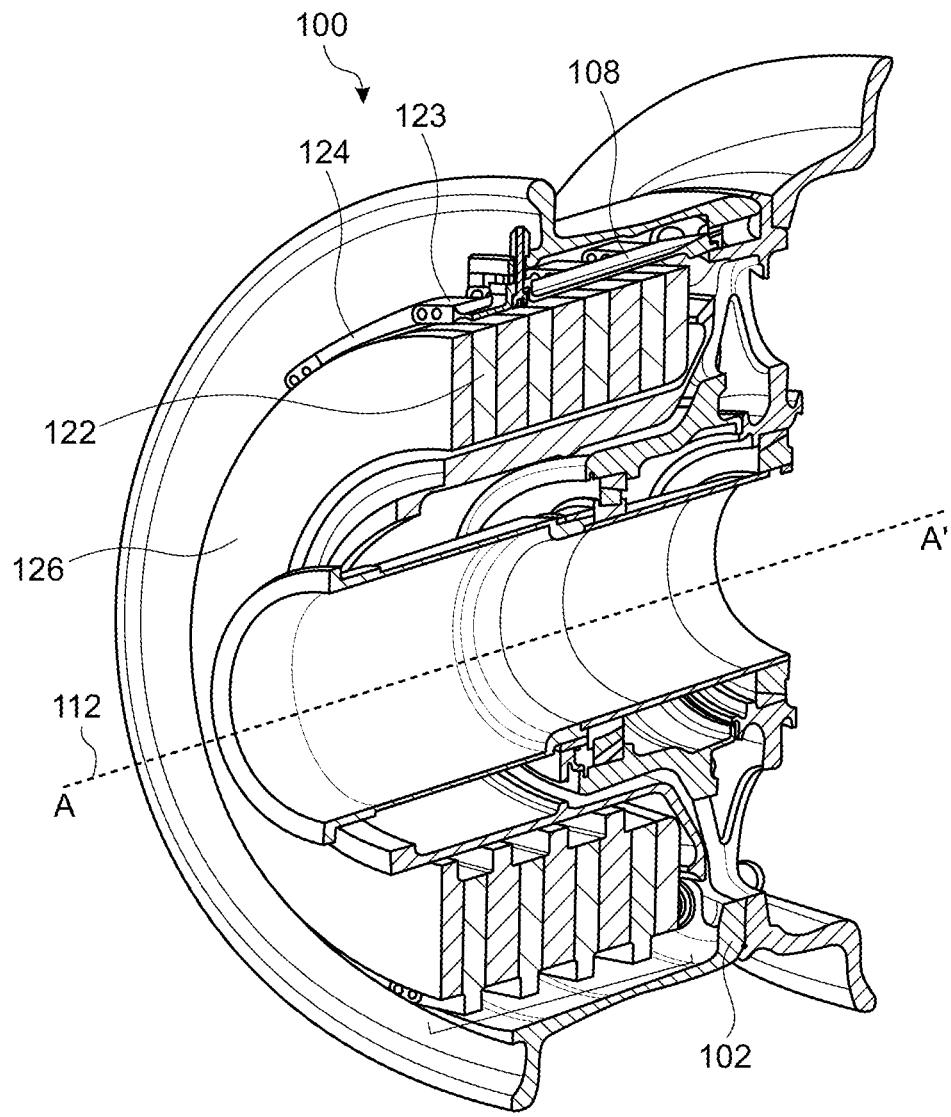
FIG. 1 is a perspective view of a section through a typical brake assembly.
Figure 2:
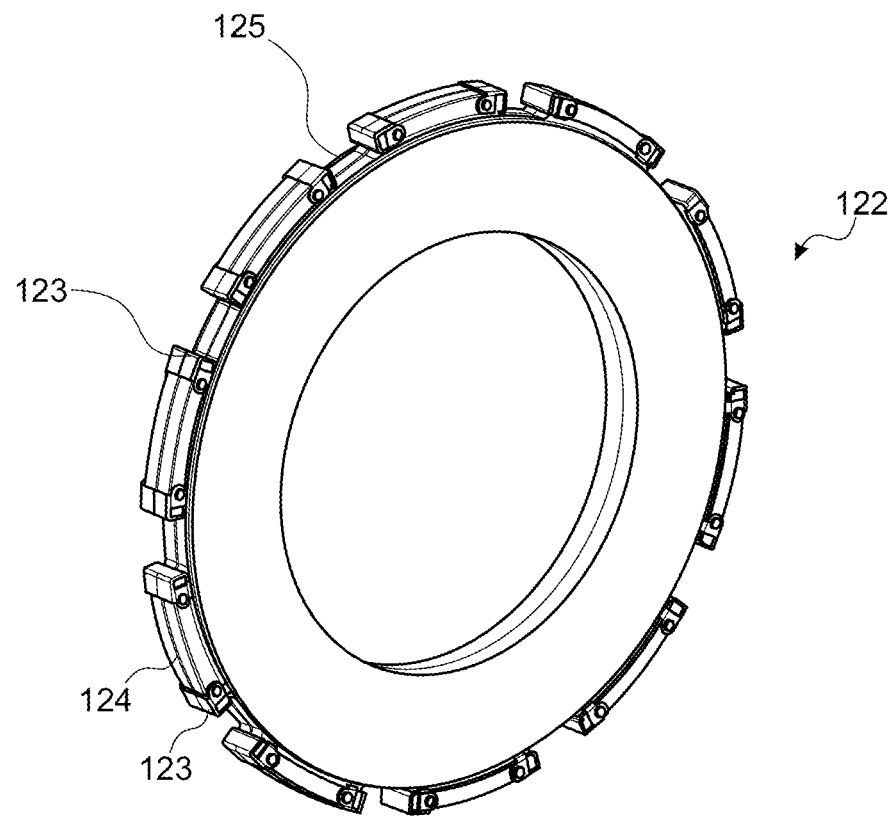
FIG. 2 is a simpler view of a rotor disk having lugs to which clips are attached.

Referring first to FIG. 1, a wheel brake assembly is shown for purposes of explanation. The brake assembly 100 is mounted within a wheel 102 which rotates about an axis A-A' 112. The brake assembly comprises a stack of alternate rotor disks 122 and stator disks 126 with the rotor disks rotatable with the wheel, and relative to the stator disks, about axis 112. To decelerate or brake rotation of the wheel pressure is applied by means of actuators in the axial direction A-A' to the brake stack to compress the rotor and stator disks together, causing friction between the rotor and stator disks and thus slowing the wheel. The rotor disks have rotor lugs 124 defined around their circumference and extending radially outwards with respect to the axis of rotation 112. Slots 125, shown in FIG. 2, are defined between adjacent lugs 124. Torque bars 108 acts as drive lugs that engage the wheel with the rotor disks via the rotor lugs.

As mentioned above, in order to protect the rotor disk material against wear, the rotor lugs 124 may be provided with protective clips 123 via which the torque is transferred from the torque bars 108 to the rotor lugs 124, and hence to the rotor disk. During use, the operation of the brake assembly will cause the brake clips 123 to wear before the rotor disk material wears, and the clips 123 can be removed and new clips fitted, without needing to replace the entire rotor disk.

The provision of clips on the rotor lugs can also been seem in the simpler view of FIG. 2 which shows a rotor disk 122 having lugs 124 provided around its circumference, with clips 123 attached to the ends of the rotor lugs.

Conventionally, these clips are attached to the rotor disks or rotor lugs by means of rivets that pass through the rotor lug from one side to the other. An example of such known clip designs is shown in FIG. 3.

Figure 3:
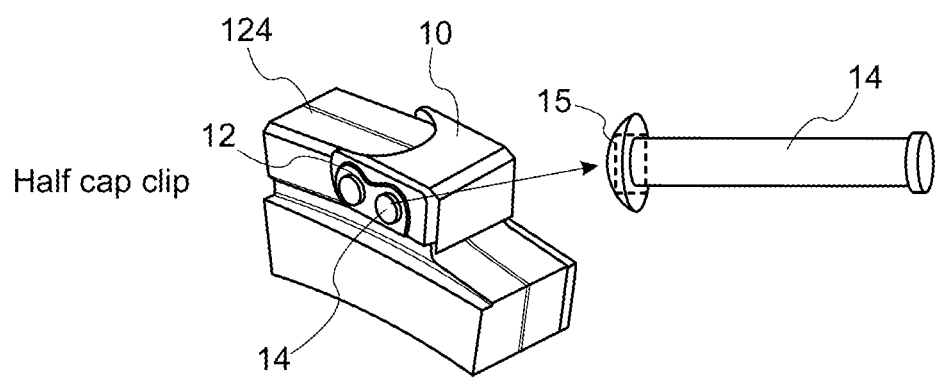
FIG. 3 shows a conventional clip with a rivet fastener.

FIG. 3 shows a so-called half cap clip 10 which has at least one rivet aperture 12 (in this example, there are two rivet apertures 12). The clip 10 is shaped to fit over the end of a rotor lug 124 and is secured to the lug by means of rivets 14 secured to the side of the lug through the clip apertures 12. As mentioned above, these rivets pass through the width of the rotor lug and can be subjected to bending forces. They can be expensive and difficult to manufacture and install and a hotspot of force can occur around the region of the rivet head 15.

The clip 300 according to the present disclosure, described below with reference to FIGS. 4 to 8, provides an alternative to the half-cap clip and two rivets for securing the clip to the lug, which is simpler to manufacture and assemble and allows for improved stress distribution, less risk of damage to the carbon of the brake and less risk of bending of the fastener.

The clip 300 according to the disclosure is shaped from sheet metal to fit over the end of a rotor lug in a manner similar to the conventional clip described above. As with the conventional clip, the clip is formed by bending the sheet metal to form a top surface 301 that extends in a first plane from a first side 311 and then transitions, at an opposite, second side 312, by a first bend 302 into a front surface 303 that extends in a second plane from a third side 313 at the first bend to a fourth side 314 and transitions by a second bend 304 to an under-surface 305 extending in a third plane to a fifth end 315. The top surface, the first bend, the front surface, the second bend and the under surface together defining a hook configuration such that, in use, the top surface fits over the top surface (the radially outer surface) of the lug onto which it is mounted, the front surface fits against the front end of the lug and the under surface hooks underneath the front end of the lug. The clip preferably also has two opposing side arms 306, 307 extending from a first end 316 at the top surface to a second end 317 and transitioning over a third bend 318 to an underside lip 319 such that the side arms fit against the sides of the lug and the underside lips hook under the lug at the sides. The shape of the clip is such that the front surface lies flat against the end of the lug so that a normal force is transferred through the flat surfaces.

The sheet metal clip structure can be easily mounted onto the end of the rotor lug and hooked over the end and the sides of the lug by means of under-surface and the underside lips. The use of sheet metal gives the clip some resilience so that it can be easily mounted and revert to the hook shape to secure around the lug.

The hook configuration means that the clip can be secured to the lug without any further fastening means, for some applications. In environments where the clip is subject to greater vibration or high speed of rotation, or greater excursions of temperature, additional securing may be provided by incorporating an aperture 320 into each of the side arms of the clip that align with a passage 500 through the lug and through which a rivet 400 can be fastened. The rivet 400 may be a standard rivet as described above having a rivet body 401 and a rivet head 402. The end 403 of the rivet body opposite the head may be formed with an extended base or configured to receive a cap or other finish to prevent the rivet withdrawing back out of the passage.

This cap may have a size and shape similar to or the same as the rivet head, although other shapes are also feasible. The cap can then be removed if it is desired to remove the rivet, so as to remove the clip.

To mount the clip to the end of the rotor lug, the clip is fitted over the end of the lug and the under-surface/undersides hook into engagement with the lug, and, where present, the apertures in the sides of the clip are aligned with the openings at the ends of the passage through the lug. The rivet 400 is then inserted from one side of the clip, pushing the end 403 of the rivet through the aperture on one side of the clip, through the lug passage and out through the aperture in the other side of the clip. The length of the rivet should be slightly longer than the combined length of the sides of the clip and the rotor lug such that when the rivet is fully inserted, the rivet head 402 abuts against one side of the clip extending across the aperture, and the other end 403 of the pin protrudes through the aperture in the other side of the clip by enough to attach the cap or other finishing to abut against the other side of the clip across the aperture in that side. Once the rivet has been pushed through the passage, the cap or other finish is provided to prevent the rivet inadvertently pulling back out.

The clip is therefore small, light, simple and inexpensive to manufacture and assemble and allows for a better transfer of force through the clip and the lug.

The invention claimed is:

1. A clip assembly for a rotor disk of a brake assembly, the clip assembly comprising:
   a clip formed of sheet metal to fit over an end of a lug of the rotor disk, the clip shaped to have a top surface that extends in a first plane from a first side and then transitions, at an opposite, second side, by a first bend into a front surface that extends in a second plane from a third side at the first bend to a fourth side and transitions by a second bend to an under-surface extending in a third plane to a fifth end, the top surface, the first bend, the front surface, the second bend and the under surface together defining a hook configuration such that, in use, the top surface fits over a top surface of the lug onto which it is mounted, the front surface fits against a front end of the lug and the under surface hooks underneath the front end of the lug.

2. The clip of claim 1, further comprising two opposing side arms extending from a first end at the top surface to a second end and transitioning over a third bend to an underside lip such that the side arms fit against sides of the lug and the underside lips hook under the lug at the sides.

3. The clip of claim 2, further comprising a rivet configured to pass through the apertures and a passage in the lug, in use.

4. The clip of claim 3, wherein the rivet has a rivet head and a rivet body extending from the rivet head along a rivet axis.

5. The clip of claim 4, wherein the rivet head extends radially outwards beyond the extent of the rivet body.

6. The clip of claim 3, wherein the rivet body has an end opposite the rivet head, the end configured to receive a cap.

7. The clip of claim 1, wherein the second plane is substantially perpendicular to the first plane and the third plane is substantially parallel to the first plane.

8. A rotor disk of a brake assembly provided with a plurality of rotor lugs around and radially extending from its circumference; and the clip as claimed in claim 1 mounted to each rotor lug.

9. A brake assembly comprising a plurality of rotor disks as claimed in claim 8 and a plurality of stator disks, the stator disks and the rotor disks arranged alternately to form a brake stack.

10. A wheel assembly comprising a wheel having an inner diameter within which is mounted to the brake assembly as claimed in claim 9.

11. The wheel assembly as claimed in claim 10, the wheel having an outer diameter onto which a tire is mounted.

12. The wheel assembly as claimed in claim 10 being the wheel assembly for the landing gear of an aircraft.

13. A method of fitting the clip assembly as claimed in claim 1 to the rotor disk of the brake assembly, the method comprising fitting the clip over an end of a rotor lug of the rotor disk such that the top surface sits on a top of the rotor lug, the front surface fits against a front end of the lug, the under-surface hooks under the front end of the lug and the underside lips hook under sides of the lug.

14. The method of claim 13, further comprising providing a rivet through the clip and the lug.

* * * * *